UNITED STATES PATENT OFFICE 2,678,947

PREPARATION OF ALPHA-HALOALKYL-BENZENE SULFONATES

Rufus Vernon Jones, Bartlesville, Okla., assignor to Phillips Petroleum Company, a corporation of Delaware No Drawing. Application September 1, 1949, Serial No. 113,677

7 Claims. (Cl. 260—505)

This invention relates to a process for the preparation of alpha-haloalkylbenzene sulfonates.

Compounds of the present invention are useful as intermediates in the production of many valuable chemical compounds. Their use in the past has been limited because of the lack of a suitable process for the production of a sufficient supply for a large demand. Alpha-haloalkylbenzene sulfonates have generally been prepared by the direct halogenation of the corresponding alkylbenzene sulfonates. One of the methods employed is to halogenate an alkaline metal salt of the alkylbenzene sulfonic acid as a dry powder. For example, sodium alpha-chloro-p-toluene sulfonate has been prepared by the direct chlorination of sodium-p-toluene sulfonate. Since the halogenation reaction is exothermic, the temperature is extremely difficult to control, particularly, when halogenating a dry powder. Unless the temperature is controlled, the substitution proceeds to the production of mixtures of halogenation compounds of indefinite composition, including both mono- and poly-substituted products. Direct halogenation of the alkylbenzene sulfonates has also been attempted in various solvents for the sulfonate compound, such as nitrobenzene and chloroform, but the rates of reaction and formation of the desired alpha-haloalkylbenzene sulfonate have been too slow to provide for the production of these compounds on a large or commercial scale. Increased reaction rates and improved yields have also been sought by the use of actinic light to promote the reaction. Thus, the preparation of these compounds by the methods of the prior art has involved various difficulties such as intermittent operation, extended reaction times, complicated cooling and process equipment, and other undesirable problems.

I have now discovered an improved process for the production of alpha-haloalkylbenzene sulfonates wherein an alkylbenzene sulfonate is interacted with an elemental halogen in the presence of a dichlorobenzene. Halogenation of the alkylbenzene sulfonate proceeds rapidly and smoothly and the conditions of the reaction are relatively mild and easily controlled. The function of the dichlorobenzene is not fully understood but must be more than a mere suspending agent for its advantages are readily recognized and it is superior to dispersing agents usually employed. High yields of the alpha-halogenated product are obtained and the product is readily recovered and purified. The halogenated product is recovered from suspension in the reacting medium and purified, such as by filtration and washing with a suitable solvent to remove impurities. By the present process of preparation in the presence of dichlorobenzene, the temperature is easily controlled and, as the reaction proceeds more readily by the present process, the conventional complicated equipment may be eliminated.

According to the process of my invention, an alkylbenzene sulfonate, for example, the sodium salt of an alkylbenzene sulfonic acid, is charged to a suitable reactor with a dichlorobenzene, such as o-dichlorobenzene, and the mixture maintained at an elevated temperature, while elemental halogen is introduced therein. For example, an alkylbenzene sulfonate may be charged to a reactor with o-dichlorobenzene and the mixture heated to a temperature in the range from 80° to 170° C., while elemental chlorine or bromine is introduced into the reactor. The conversion may be represented by the following generalized reaction:

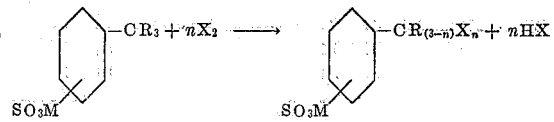

where R is selected from the group consisting of H and alkyl radicals with at least one R being H; the total number of carbon atoms in the combined R's being not greater than 20; $n$ is an integer selected from the group consisting of 1, 2 and 3 but will be no greater than the number of H atoms attached to the alpha carbon atom; X is a halogen; and M represents an alkali or alkaline earth metal.

Although the typical reaction and product illustrated above is a monoalkylated aromatic sulfonate having only a single sulfonate group, it will be understood that the initial aromatic sulfonate may possess other alkyl groups which can be the same or different and also the aromatic nuclear ring can be substituted with more than one sulfonate group. For example, alkylbenzene sulfonates which may be employed in this reaction will have the general formula:

in which Y is at least 1 and not greater than 5 and in which R is as indicated above. The extent of possible halogen substitution in the alpha position of the alkyl substituents is a function of the number and of the nature of the alkyl groups. A single methyl group, that is, toluene sulfonate, may undergo substitution with either one, two or three halogen atoms. A single ethyl or higher alkyl group can only be substituted with one or two halogen atoms in the alpha position. These numbers of possible substitutions are increased proportionately as the number of the respective alkyl groups is increased. Similarly, nuclear substituents may include various other suitable groups which are non-reactive with the halogen and which do not unduly interfere with the halogenation of the alpha-carbon atoms of the alkyl groups. The alpha-haloalkylbenzene sulfonates produced by the process of this invention have the formula

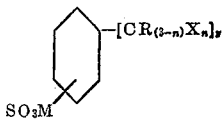

wherein R, X, M, $n$ and $y$ are as defined above.

Although various metal salts of the different alkylbenzene sulfonic acids may be employed as starting materials in the present process, the sodium or potassium salts of these acids are preferred because of their ready availability and relative cheapness. Typical of the compounds which are especially adaptable to the present process are sodium toluene sulfonate, sodium ethylbenzene sulfonate, potassium isopropyltoluene sulfonate, and other similar alkali metal alkylbenzene sulfonates.

By suitable adjustment of the reaction time and temperature and of the amount of halogen added, considerable control can be asserted upon the degree of substitution. Thus, varying proportions of the mono-, di-, or tri-alpha-substituted halogenated products can be prepared and with suitable conditions a particular substituted product can be made to predominate. For example, by controlling the reaction, specifically of sodium toluene sulfonate with elemental chlorine, a product may be obtained which is predominantly sodium mono-, di-, or tri-alpha-chloro-p-toluene sulfonate. By the present process and by suitable control of the conditions of reaction, various alpha-halogenated salts of alkylbenzene sulfonic acids such as sodium alpha-chloro-p-toluene sulfonate; sodium alpha, alpha-dichloro-p-toluene sulfonate; sodium alpha, alpha, alpha-trichloro-p-toluene sulfonate; and sodium alpha-chloro-p-ethylbenzene sulfonate may be prepared as well as other sodium and corresponding potassium salts of various alpha-halogenated alkylbenzene sulfonates.

Suitable dispersing agents are the isomeric dichlorobenzenes. Although it is preferable to use ortho- and meta-dichlorobenzenes which are liquid at ordinary temperatures, it is also possible to use the para-dichlorobenzene when the temperature conditions are such that it is also liquid, i. e., when the temperature is above its melting point of 53° C. The dichlorobenzene dispersing agent is admixed with the alkylbenzene sulfonate in a ratio between 1:3 and 1:10 parts by weight of sulfonate to dispersing agent and the admixture thoroughly agitated while the halogenating agent is introduced.

Suitable conditions include a temperature between 80° and 170° C., although preferable temperatures are between 120° and 150° C. The pressure is approximately atmospheric although pressures substantially above or below atmospheric may also be employed. Reaction time will usually be from about 10 to 40 hours with sufficient agitation of the reaction mixture to maintain complete dispersion of the reactants throughout the reaction period. Conversions above 50% are usually obtainable in about 15 hours at a temperature of about 120° C. The product of reaction may be recovered from the dispersing agent by filtration and purified by washing with a suitable solvent such as benzene to remove impurities, by recrystallizing from a suitable solvent or by similar purification. The product is then dried.

Comparative examples of the present process and of several prior processes are given below showing the improved yield and the control of reaction product that may be obtained by operating according to the present process:

*Example I*

Three hundred and twenty-three parts by weight of anhydrous sodium toluene sulfonate (100 mesh) was charged to a reactor containing one thousand parts by weight of o-dichlorobenzene and the mixture heated to 120° C. with agitation. Gaseous chlorine was then introduced for fifteen hours. At the end of this period the reaction mixture was cooled to room temperature and filtered. The solid material was washed with benzene and dried. Analysis showed a conversion of 64.67 per cent to a chlorinated product. An additional sixteen hour treatment of this material was carried out in the manner described above and provided a yield of 97 per cent of a product consisting of 90 per cent of sodium alpha-chloro-p-toluene sulfonate and ten per cent of sodium alpha, alpha-dichloro-p-toluene sulfonate.

*Example II*

One hundred and twenty-five parts by weight of anhydrous sodium-p-toluene sulfonate powder was charged to a reactor and heated to 120° to 140° C. and elemental chlorine introduced at a steady rate. Hydrogen chloride was evolved rapidly and the exothermic reaction made temperature control extremely difficult. Intermittent of the material was then continued over a period of five days until no further gain in weight was perceptible after a continuous four hour run. Analysis showed the product to be a mixture of 65.9 per cent of sodium alpha-chloro-p-toluene sulfonate and 34.1 per cent of sodium alpha, alpha-dichloro-p-toluene sulfonate.

*Example III*

One hundred and ninety-four parts by weight of sodium p-toluene sulfonate was intermixed with five hundred parts by weight of nitrobenzene. The mixture was then heated to 120° to 140° C. with agitation while seventy parts by weight of gaseous chlorine was added intermittently over a 72-hour period in the presence of ultraviolet light. Chlorination proceeded so slowly that 0.2 gram of benzoyl peroxide was added as a catalyst. However, no increase in rate of chlorination was observed. The reaction mixture was filtered and the product recovered as the residue. Purification of the product was effected by washing with cold alcohol and recrystallizing from water. A conversion of 18.6 per cent was obtained.

A comparison of the results in the above examples in which sodium toluene sulfonate was chlorinated readily demonstrates the improvements in reaction time, yield and purity of the alpha-chlorinated toluene sulfonate when the chlorination is conducted according to the present process in Example I as compared with two of the conventional processes for halogenating alkylbenzene sulfonates as illustrated by Examples II and III. Although the processes are compared employing sodium toluene sulfonate, the advantages and improvements of the present process are realized when halogenating other alkylbenzene sulfonates and the present invention includes the halogenation of such sulfonates.

I claim:

1. A process for the preparation of an alpha-chloroalkylbenzene sulfonate wherein the alkyl substituent contains not more than 20 carbon atoms which comprises reacting a sodium salt of a corresponding alkylbenzene sulfonic acid with chlorine in an excess of o-dichlorobenzene at a temperature between 120° to 150° C.

2. A process for the preparation of alpha-chloro-p-toluene sulfonate which comprises reacting sodium p-toluene sulfonate with elemental chlorine in the presence of an excess of o-dichlorobenzene at a temperature of about 120° C.

3. A process for the preparation of an alpha-haloalkylbenzene sulfonate wherein the alkyl substituent contains not more than 20 carbon atoms which comprises reacting gaseous chlorine with a corresponding alkylbenzene sulfonate in the presence of dichlorobenzene at a temperature between 80 and 170° C.

4. A process for the preparation of an alpha-haloalkylbenzene sulfonate wherein the alkyl substituent contains not more than 20 carbon atoms which comprises reacting bromine with a corresponding alkylbenzene sulfonate in the presence of dichlorobenzene at a temperature between 80 and 170° C.

5. A process for the preparation of an alpha-haloalkylbenzene sulfonate wherein the alkyl substituent contains not more than 20 carbon atoms which comprises reacting a gaseous chlorine with an admixture of an alkali metal salt of a corresponding alkylbenzene sulfonic acid and dichlorobenzene in an amount between 1:3 and 1:10 parts by weight to dichlorobenzene at a temperature between 80° and 170° C. for a period of from 10 to 40 hours.

6. A process for the preparation of an alpha-haloalkylbenzene sulfonate of the general formula

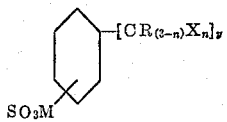

where R is selected from the group consisting of H and alkyl radicals with at least one R being H; the total number of carbon atoms in the combined R's being not greater than 20; $n$ is an integer selected from the group consisting of 1, 2 and 3 but will be no greater than the number of H atoms attached to the alpha carbon atom; X is a chlorine atom and M is selected from the group consisting of the alkali and alkaline earth metal which comprises reacting a metal salt of a corresponding alkylbenzene sulfonic acid of general formula

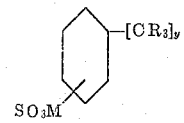

wherein $y$ is at least 1 and no greater than 5 and the other designation of radicals is as above, with a chlorine at a temperature between 80° and 170° C. in the presence of an excess of dichlorobenzene.

7. A process for the preparation of alpha-haloalkylbenzene sulfonate wherein the alkyl substituent contains not more than twenty carbon atoms, which comprises reacting an elemental halogen selected from the group consisting of chlorine and bromine with a corresponding alkylbenzene sulfonate in the presence of an excess by weight of liquid dichlorobenzene.

References Cited in the file of this patent

UNITED STATES PATENTS

| Number | Name | Date |
| --- | --- | --- |
| 2,302,228 | Karasch | Nov. 17, 1942 |
| 2,460,564 | Amacker | Feb. 1, 1949 |

FOREIGN PATENTS

| Number | Country | Date |
| --- | --- | --- |
| 68,994 | Switzerland | Aug. 26, 1914 |
| 293,319 | Germany | July 25, 1916 |
| 312,959 | Germany | June 21, 1919 |

OTHER REFERENCES

"The Chemistry of Petroleum Derivatives," by Ellis (1934). The Chemical Catalogue Co., Inc., pp. 769–770.